(12) United States Patent
Bauditsch et al.

(10) Patent No.: US 10,978,764 B2
(45) Date of Patent: Apr. 13, 2021

(54) BATTERY AIR DRYER, BATTERY SYSTEM AND ELECTRIC VEHICLE BATTERY

(71) Applicant: MANN+HUMMEL GmbH, Ludwigsburg (DE)

(72) Inventors: Peter Bauditsch, Boennigheim (DE); Basil Paul Kallumgal, Karnataka (IN)

(73) Assignee: MANN+HUMMEL GmbH, Ludwigsburg (DE)

(*) Notice: Subject to any disclaimer, the term of this patent is extended or adjusted under 35 U.S.C. 154(b) by 28 days.

(21) Appl. No.: 16/382,716

(22) Filed: Apr. 12, 2019

(65) Prior Publication Data
US 2019/0319235 A1  Oct. 17, 2019

(30) Foreign Application Priority Data

Apr. 12, 2018 (EP) ..................... 18166916

(51) Int. Cl.
| | |
|---|---|
| *H01M 2/10* | (2006.01) |
| *H01M 50/24* | (2021.01) |
| *B60L 50/64* | (2019.01) |
| *H01M 10/52* | (2006.01) |
| *H01M 50/20* | (2021.01) |
| *B60L 58/10* | (2019.01) |

(52) U.S. Cl.
CPC ............. *H01M 50/24* (2021.01); *B60L 50/64* (2019.02); *H01M 10/52* (2013.01); *H01M 50/20* (2021.01); *B60L 58/10* (2019.02); *B60Y 2200/91* (2013.01); *B60Y 2400/112* (2013.01); *H01M 2220/20* (2013.01)

(58) Field of Classification Search
CPC ............. H01M 2/1094; H01M 10/052; H01M 10/0525; H01M 2/1077; H01M 10/52
See application file for complete search history.

(56) References Cited

U.S. PATENT DOCUMENTS

| | | | | |
|---|---|---|---|---|
| 9,595,705 | B1 * | 3/2017 | Buckhout | ........... H01M 2/1077 |
| 2014/0199566 | A1 * | 7/2014 | Gless | ..................... H01M 2/32 |
| | | | | 429/72 |
| 2016/0372726 | A1 | 12/2016 | Baldwin | |

FOREIGN PATENT DOCUMENTS

| | | |
|---|---|---|
| DE | 102011084351 A1 | 4/2013 |
| DE | 102014203927 A1 | 9/2015 |
| DE | 102014216377 A1 | 2/2016 |
| JP | 2002079043 A | 3/2002 |

\* cited by examiner

*Primary Examiner* — Olatunji A Godo
(74) *Attorney, Agent, or Firm* — James Hasselbeck

(57) ABSTRACT

A battery air dryer for drying air within a battery housing of an electric vehicle battery has a support structure for dryer material. The support structure has a first fixing element coupling with a first coupling element of the battery housing and a second fixing element coupling with a second coupling element of the battery housing. The first and second fixing elements are arranged on different sides of the support structure such that a first distance between the first fixing element and a reference plane differs from a second distance between the second fixing element and the reference plane. The reference plane is a plane cutting the support structure horizontally when the battery air dryer is mounted in the battery housing in a designated orientation. Only the first fixing element or only the second fixing element is arranged in a first fixing plane parallel to the reference plane.

20 Claims, 6 Drawing Sheets

BATTERY AIR DRYER, BATTERY SYSTEM AND ELECTRIC VEHICLE BATTERY

BACKGROUND OF THE INVENTION

The present invention relates to a battery air dryer, a battery system comprising the battery air dryer, and an electric vehicle battery comprising the battery system.

When moisture in the air in a battery housing of an electric vehicle battery condenses, the electric vehicle battery can become damaged by corrosion. To avoid such a damage, the air within the battery housing can be dried with a battery air dryer. The battery air dryer can be mounted inside the battery housing at manufacturing.

US 2016/0372726 A1 discloses a known battery air dryer which comprises a frame that provides at least one passageway to communicate air through the frame to an interior of a battery pack. The frame holds a desiccant and a membrane for preventing liquid from communicating though the passageway to the interior of the battery pack.

It is desired to correctly mount the battery air dryer inside the battery housing to ensure the correct functioning of the battery air dryer and/or to avoid damaging the battery air dryer and/or the battery.

In view of the above, it is one object of the present invention to provide an improved battery air dryer. Further objects are the provision of an improved battery system and the provision of an improved electric vehicle battery.

SUMMARY OF THE INVENTION

According to a first aspect, a battery air dryer for drying air within a battery housing of an electric vehicle battery is provided. The battery air dryer comprises a support structure and dryer material arranged in the support structure, the support structure comprising:

a first fixing element adapted to couple with a corresponding first coupling element of the battery housing and a second fixing element adapted to couple with a corresponding second coupling element of the battery housing, the first and second fixing elements being arranged on different sides of the support structure such that a distance between the first fixing element and a reference plane is different from a distance between the second fixing element and the reference plane, the reference plane being a plane cutting the support structure horizontally when the battery air dryer is mounted in the battery housing, in particular in a designated orientation, wherein only one fixing element is arranged in a first fixing plane that is parallel to the reference plane, the first or second fixing element being the only one fixing element arranged in the first fixing plane.

The electric vehicle battery may be a battery used to provide power for the propulsion of an electric vehicle. The electric vehicle battery can be arranged within the electric vehicle. The electric vehicle may be purely powered by the electric vehicle battery, or a hybrid vehicle. The electric vehicle may be an automobile, a motorcycle, a truck or an electric bike. One can contemplate other applications such as aerial or naval vehicles or trains.

In particular, the battery housing is not hermetically sealed to allow an air exchange with the outside, for example for pressure equalization when the ambient temperature changes. When the temperature drops, the air within the battery housing can condense and water droplets can form inside the battery housing. The water can lead to corrosion of battery components and to a damaging of the electric vehicle battery, also called "battery" in the following.

The battery air dryer may be arranged within the battery housing for drying air within the battery housing. The formulation according to which the battery air dryer dries air within the battery housing does not necessarily imply that the battery air dryer is arranged in the battery housing. Rather, the battery air dryer can be considered as an isolated entity for drying air. In particular, such an isolated battery air dryer is adapted to dry air within the battery housing.

The battery air dryer in particular dries the air within the battery housing before it condenses, whereby the formation of water inside the battery housing can be prevented and the lifetime of the battery increased. To dry the air within the battery housing, the battery air dryer comprises a dryer material such as a desiccant, for example silica gel. The dryer material may be supported by the support structure, which can be a housing for the dryer material. The support structure can be have a cage-like structure with openings for allowing the air present within the battery housing to enter in contact with the dryer material for being dried. In embodiments, the support structure has a cuboid shape. The support structure can enclose an internal reception chamber for the desiccant and have at least one venting opening on its enveloping surface.

The battery air dryer may be fixed to the battery housing by means of the first and second fixing elements provided on the support structure. In some embodiments, the battery air dryer comprises exactly two fixing elements, namely the first and the second fixing element. The first and second fixing elements can be arranged on opposite sides of the support structure. The first and second fixing elements may respectively be coupled to the corresponding first and second coupling elements of the battery housing such as to fix the support structure to the battery housing. The verb "couple" in particular indicates that the first and second fixing elements engage with the corresponding first and second coupling elements.

When the battery air dryer is correctly mounted at the battery housing, the reference plane can be horizontal. In particular, the battery air dryer is correctly mounted when it is mounted at a predetermined position of the battery housing and in a designated orientation. In the designated orientation, the first fixing element can couple with the corresponding first coupling element and the second fixing element can couple with the corresponding second coupling element.

The first fixing plane which comprises the first or the second fixing element may also be horizontal. In particular, there is no fixing element in the first fixing plane apart from the first or the second fixing element. In other word, if the first fixing element is located in the first fixing plane, the second fixing element and further fixing elements are not arranged in the first fixing plane. Similarly, if the second fixing element is located in the first fixing plane, the first fixing element and further fixing elements are not arranged in the first fixing plane.

In particular, there is no further fixing element arranged in the first fixing plane on the other side of the support structure from the only one fixing element. Since only one fixing element is located in the first fixing plane, the battery air dryer is assymetric with respect to an axis extending perpendicularly to the first fixing plane through the battery air dryer. Having only one fixing element located in the first fixing plane can thus be advantageous because upon rotation of the battery air dryer around the axis extending perpendicularly to the first fixing plane through the battery air dryer, the battery air dryer cannot be fixed to the battery housing. In particular, the battery air dryer can only be mounted at the battery housing in one orientation, in particular in the designated orientation.

To mount the battery air dryer at the battery housing, in particular in the designated orientation, the first and second fixing elements of the battery air dryer may be approached from the corresponding first and second coupling elements of the battery housing vertically. That way, the battery air dryer can be mounted at the battery housing vertically (in particular from above). This can be advantageous if the available space for mounting the battery air dryer is limited.

The distance between the reference plane and the first fixing element is different from the distance between the reference plane and the second fixing element. In particular, a height of the first fixing element is different from a height of the second fixing element as seen from the reference plane. The distance between the reference plane and the first fixing element may indicate a shortest possible distance between any point from the reference plane and any point from the first fixing element. Similarly, the distance between the reference plane and the second fixing element may indicate a shortest possible distance between any point from the reference plane and any point from the second fixing element.

In embodiments, the distance between the reference plane and the first fixing element refers to a distance between the reference plane and a first coupling plane where the first fixing element and the corresponding first coupling element couple to each other. The first coupling plane can be a contact surface between the first fixing element and the corresponding first coupling element. Further, the distance between the reference plane and the second fixing element refers to a distance between the reference plane and a second coupling plane where the second fixing element and the corresponding second coupling element couple to each other. The second coupling plane can be a contact surface between the second fixing element and the corresponding second coupling element.

The first and second fixing elements may be located at different heights along the support structure. For example, the height of the first fixing element is different from a height of the second fixing element as seen from a bottom surface of the support structure. In particular, the first and second fixing elements are arranged in an asymmetrical manner on the support structure. For example, the first and second fixing elements are arranged asymmetrically on the support structure with respect to a vertical line and/or a vertical plane that cuts the reference plane perpendicularly.

The corresponding coupling elements of the battery housing may be positioned accordingly to be coupled with the first and second fixing elements of the support structure. Due to the positioning of the first and second fixing elements, the battery air dryer can in particular only be mounted correctly at the battery housing.

In particular, when the battery air dryer is rotated by 180° such as to be mounted in a reversed direction, the battery air dryer cannot be fixed to the battery housing by coupling the first and second fixing elements to the corresponding coupling elements. For example, mounting of the battery air dryer in the reversed direction can be avoided because the first fixing element cannot be coupled to the corresponding second coupling element while the second fixing element is coupled to the corresponding first coupling element. The positioning of the fixing elements on the support structure as described above can prevent the battery air dryer from being mounted wrongly within the battery housing. In particular, it can be ensured that the battery air dryer is fixed correctly. Thereby, the mounting of the battery air dryer may be facilitated and the correct functioning of the battery air dryer may be ensured.

In some further embodiments, only one fixing element is arranged in a second fixing plane that is parallel to the reference plane, the only one fixing element arranged in the second fixing plane being the first or second fixing element which is not arranged in the first fixing plane. The second fixing plane may also be horizontal. The same advantages may arise from the single fixing element arranged in the second fixing plane as for the single fixing element arranged in the first fixing plane.

In another embodiment the first and/or second fixing elements can have an essentially hollow cylindrical shape with a longitudinal axis located externally to an enveloping surface of the support structure. Those fixing elements can advantageously be coupled with corresponding cylindrical elements on the battery housing simply by inserting the housing side fixing elements. The specified location of the longitudinal axis of the fixing elements makes it possible to easily attach a screw or the like to secure the battery air dryer to the housing.

According to an embodiment, the support structure further comprises at least one rib protruding outwards from the support structure. In particular, the rib is an elevation or protrusion of the support structure. The surface support structure forming the rib may be smaller than the remaining surface of the support structure, which is not forming the rib. The rib can be integrally formed with the support structure.

For example, the rib can be arranged on an upper surface of the support structure or on the first and/or second fixing element. In particular, the location of the rib is chosen such as to break a symmetry of the support structure. For example, the rib is located on the first or second fixing element but not on the other fixing element. Alternatively, if the support structure has a substantially cuboid shape, one predetermined surface of the support structure may comprise a rib but the surface opposed to the predetermined surface may not comprise a rib.

The at least one rib can be located such as to collide with a portion of the battery housing, in particular with a protruding portion of the battery housing, when the battery air dryer is mounted in an incorrect orientation which is different from the designated orientation. In particular, the rib collides with a side wall of the battery housing when one intends to mount the battery air dryer in a reversed orientation. Such a collision can prevent the coupling of the first and second fixing elements to the first and second coupling elements, thereby prohibiting the fixing of the battery air dryer to the battery housing. The rib(s) can hence have a poka-yoke function. By means of the rib, the correct positioning and fixing of the battery air dryer within the battery housing may be ensured.

According to another embodiment, the support structure comprises a receptacle for holding the dryer material and a lid for closing the receptacle, the lid being removeably attacheable to the receptacle through an attaching element, in particular a snap.

In particular, the support structure is made of two parts: the receptacle and the lid. The receptacle and the lid may be at least partially permanently attached to each other. The attaching element can allow to open and close the support structure, for example to insert the dryer material into the support structure and/or to replace the dryer material.

According to a further embodiment, the receptacle and the lid are connected to each other by a film hinge. By means of the film hinge, the lid of the support structure may be opened without completely detaching the lid from the receptacle. In particular, the film hinge is provided on a single side of the lid and/or receptacle. The film hinge may be glued onto the receptacle and/or lid, or may be integrally formed therewith.

According to a further embodiment, the receptacle, the lid and/or the support structure is integrally formed. In particular, the integrally formed receptacle, lid and/or support structure are made of an integrally formed molded plastic piece. Forming the receptacle, the lid and/or the support structure integrally may facilitate their manufacture.

According to a further embodiment, the first and/or second fixing element and/or the first and/or second coupling element includes:

a pin, in particular a vertical pin, for being inserted in a corresponding opening of the corresponding coupling element or fixing element;

a clamp for clamping to a portion of the corresponding coupling element or fixing element; and/or a screw hole for being aligned with another screw hole of the corresponding coupling element or fixing element and for fastening a screw through the aligned screw holes.

For example, the first and second fixing elements both include vertical pins and the first and second coupling elements both include openings for receiveing the vertical pins. Alternatively, the first and second fixing elements can be clamps and the size and shape of the first and second coupling elements can be chosen such that the clamps can be attached thereto by clamping.

Further, the first and second fixing elements and the first and second coupling elements can comprise screw holes. In particular, at least one screw hole out of two aligned screw holes is provided with an internal thread to allow the fastening of the screw, and thereby fix the fixing elements to the corresponding coupling elements.

In particular, the first and/or second fixing elements can be removeably fixed to the first and/or second coupling elements.

According to a further embodiment, the support structure has a substantially cuboid shape and the first and second fixing elements are arranged on opposite sides of the support structure. For example, the opposite sides of the support structure are parallel surfaces of the support structure.

According to a second aspect, a battery system is provided. The battery system comprises a battery housing for accomodating an electric vehicle battery and a battery air dryer according to the first aspect or according to an embodiment of the first aspect for drying air within the battery housing.

According to an embodiment, the battery housing comprises a first coupling element adapted to couple with a first fixing element of the battery air dryer and a second coupling element adapted to couple with a second fixing element of the battery air dryer, wherein only one coupling element is arranged in a first coupling plane that is parallel to the reference plane, the first coupling element or the second coupling element being the only one coupling element arranged in the first coupling plane.

Similarly, the other coupling element from the first and second coupling elements may be arranged in a second coupling plane of the battery housing that is parallel to the reference plane and is free from any further coupling elements. That way, the battery housing may be adapted to receive only one fixing element in the first coupling plane and only one fixing element in the second coupling plane. The battery housing may thus receive the battery air dryer only when it is positioned in the correct orientation, in particular in the designated orientation.

According to a further embodiment, the designated orientation of the battery air dryer in the battery housing is an orientation of the battery air dryer in which the first fixing element of the support structure couples with the corresponding first coupling element of the battery housing and the second fixing element of the support structure couples with the corresponding second coupling element of the battery housing.

In embodiments, the battery air dryer is fixable to the battery housing only when it is mounted in the designated orientation.

According to a further embodiment, a distance between the first coupling element of the battery housing and the reference plane is different from a distance between the second coupling element of the battery housing and the reference plane when the battery air dryer is mounted in the battery housing in the designated orientation.

The distance from the first coupling element to the reference plane and the distance from the second coupling element to the reference plane can be equal to the distance from the first fixing element to the reference plane and the distance from the second fixing element to the reference plane. The location of the first and second coupling elements may be chosen in accordance with the location of the first and second fixing elements.

The distance between the first coupling element and the reference plane can be the shortest distance between the first coupling element and the reference plane. The distance between the second coupling element and the reference plane can be the shortest distance between the second coupling element and the reference plane. Alternatively, the distance between the first (respectively second) coupling element and the reference plane can designate a distance between the first (respectively second) coupling plane and the reference plane, as described above.

In particular, a height of the first coupling element as seen from a bottom wall of the battery housing can be larger or smaller than a height of the second coupling element as seen from the bottom wall of the battery housing.

According to a further embodiment, the first and second fixing elements respectively couple to the corresponding first and second coupling elements only when the battery air dryer is mounted in the designated orientation.

According to a further embodiment, the at least one rib protruding outwards from the support structure is located such as to collide with a portion of the battery housing when the battery air dryer is mounted in the battery housing in an orientation that is different from the designated orientation.

In particular, the rib collides with the battery housing when the battery air dryer is mounted in a reversed orientation, in which it is rotated by 180° as compared to the designated orientation.

According to a further embodiment, the attaching element is visible during manufacturing of the battery system by a person mounting the battery air dryer at the battery housing or controlling the mounting of the battery air dryer at the battery housing when the battery air dryer is mounted at the battery housing in the designated orientation.

In particular, the battery air dryer is mounted in an orientation in which the attaching element is visible for control purposes. For example, the attaching element is visible as long as the battery housing is not closed. Orienting the battery air dryer such that the attaching element is visible is advantageous in that it can easily be checked whether the support structure is correctly closed. Thereby, it can be avoided that the dryer material gets spilled within the battery housing.

In embodiments, the support structure of the battery air dryer can be opened in the state in which it is fixed to the battery housing. This may allow a replacement of the dryer material without having to detach the battery air dryer from the battery housing.

According to a third aspect, an electric vehicle battery is provided. The electric vehicle battery comprises:

the battery system according to the second aspect or to an embodiment of the second aspect, and battery components for powering an electric vehicle.

According to a fourth aspect, an air dryer arrangement is provided. The air dryer arrangement comprises the battery air dryer according to the first aspect or according to an embodiment of the first aspect and first and second coupling elements. In particular, the first and second coupling elements are mounted on a wall, for example for holding the battery air dryer during manufacture.

The features described above and below in conjunction with the battery air dryer according to the first aspect or according to an embodiment of the first aspect also apply to the battery system according to the second aspect or according to an embodiment of the second aspect and to the electric vehicle battery according to the third aspect.

Further possible implementations or alternative solutions of the battery air dryer, the battery system and the electric vehicle battery also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the battery air dryer, battery system and electric vehicle battery will become apparent from the subsequent description and dependent claims, taken in conjunction with the accompanying drawings.

In the Figures, like reference numerals designate like or functionally equivalent elements, unless otherwise indicated.

DESCRIPTION OF PREFERRED EMBODIMENTS

Figure 1:
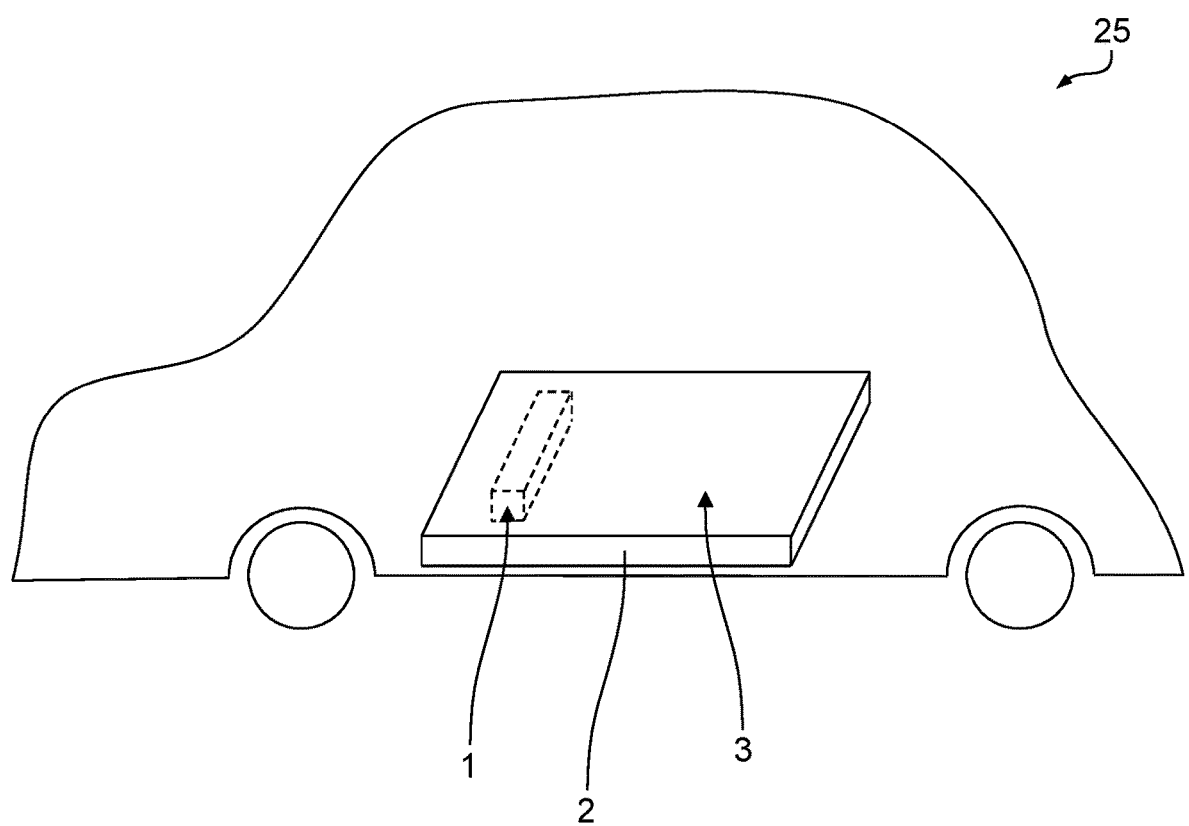
FIG. 1 shows an example of an electric vehicle.

FIG. 1 shows an example of an electric vehicle 25. The electric vehicle 25 is an electric car, which is powered by an electric vehicle battery 3, also called "battery 3" in the following. The battery 3 is arranged at the bottom of the electric car 25. It comprises battery components such as battery cells and the like (not shown in FIG. 1) arranged within a battery housing 2.

The battery housing 2 has a flat and substantially cuboid shape. The battery housing 2 is about 1.5 m long, 0.8 m large and 0.1 m high. The housing 2 is not hermetically sealed such that air can flow between an inside of the housing 2 and an outside of the housing 2. This air flow allows pressure equalization between inside and outside of the battery housing 2, thereby reducing an explosion risk of the battery housing 2. In particular, about 30 l of free air are present in the battery housing 2 at any time.

When the temperature of the battery 3 drops, for example, due to weather conditions, the humidity of the air can condense and form water within the battery housing 2. The formation of water within the battery housing 2 is undesirable because it can damage the components of the battery 3, for example, by corrosion.

A battery air dryer 1 is provided within the battery housing 2 to dry the air inside the battery housing 2 and thereby avoid its condensation to water. The battery air dryer 1 will be described in view of FIGS. 2 to 4 in the following.

Figure 2:
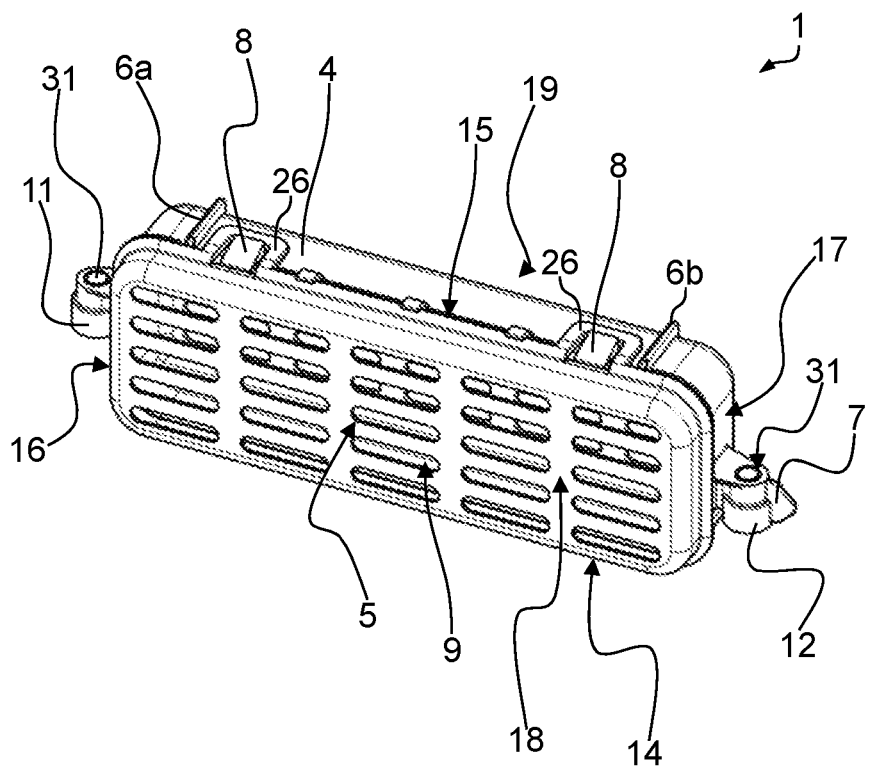
FIG. 2 shows a first perspective view of a battery air dryer.

FIG. 2 shows a first perspective view of the battery air dryer 1. The battery air dryer 1 comprises a support structure 4, which is a substantially cuboid cage-like container holding dryer material 5 on its inside. The dryer material 5 is silica gel. The support structure 4 is made of a single molded plastic piece.

In the orientation of FIG. 2, the support structure 4 comprises a bottom surface 14, an upper surface 15, a left surface 16, a right surface 17, a front surface 18 and a back surface 19. The front and back surfaces 18, 19 each comprise a plurality of openings 9 for letting air access the dryer material 5 contained inside the support structure 4.

On the left surface 16, the support structure 4 comprises a first fixing element 11 configured as a flange with a screw hole 31. Similarly, on the right surface 17, the support structure 4 comprises a second fixing element 12 also configured as a flange with a screw hole 31. The first and second fixing elements 11, 12 are arranged at different heights from the bottom surface 14, as visible in FIG. 4, which shows a front view of the battery air dryer 1.

Namely, a first distance d1, which corresponds to a distance between the first fixing element 11 and a reference plane P, is greater than a second distance d2, which corresponds to a distance between the second fixing element 12 and the reference plane P. The distances are here measured from the lowest points of the fixing elements 11, 12. The reference plane P is here parallel to a base plane BP containing the bottom surface 14 of the support structure 4. More generally speaking, the reference plane P cuts the support structure horizontally when the battery air dryer 1 is in the orientation shown in FIG. 4, which corresponds to a designated orientation.

The support structure 4 comprises a single fixing element (namely the first fixing element 11) that is arranged in a first fixing plane FP1. The first fixing plane FP1 is parallel to the reference plane P and cuts the first fixing element 11. Similarly, the support structure 4 comprises a single fixing element (namely the second fixing element 12) that is arranged in a second fixing plane FP2. The second fixing plane FP2 is parallel to the reference plane P and cuts the second fixing element 12.

The support structure 4 further comprises two attaching elements 8 and two loops 26. The attaching elements 8 are snaps which allow to close and open the support structure 4 by respectively holding and releasing the loops 26. They are arranged on the upper surface 15 of the support structure 4, as shown in FIG. 2.

Figure 3:
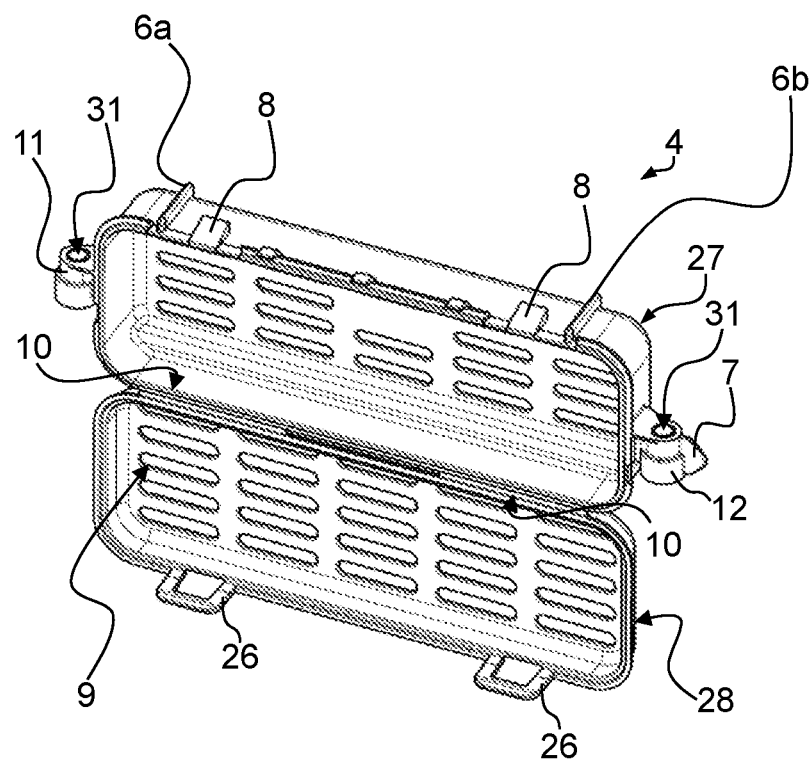
FIG. 3 shows a second perspective view of the battery air dryer.

FIG. 2 shows the support structure 4 in a closed state, in which the snaps 8 hold the loops 26. When both snaps 8 are pressed at the same time, the loops 26 are released and the support structure 4 opens up, as shown in FIG. 3, which shows the support structure 4 in an open state. As shown in FIG. 3, the support structure 4 comprises a receptacle 27 and a corresponding lid 28 connected to each other by a film hinge 10.

Figure 4:
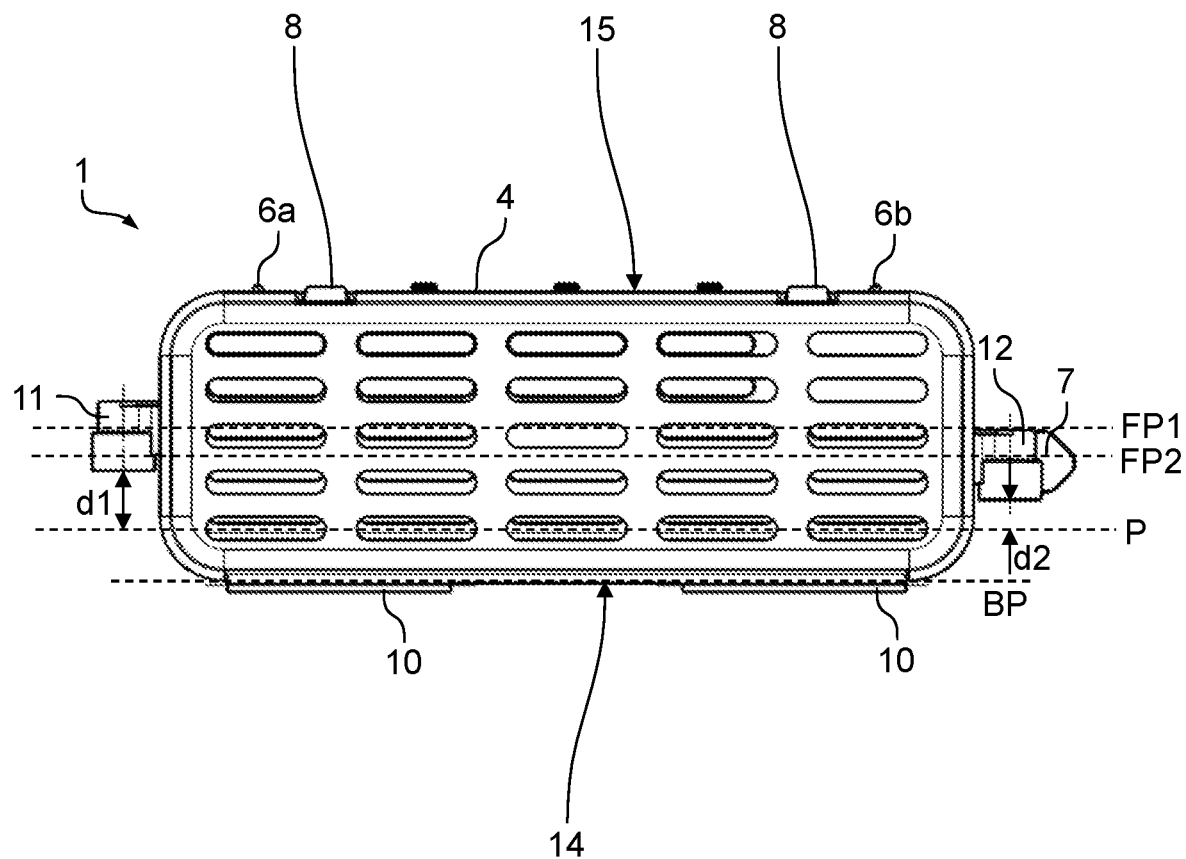
FIG. 4 shows a front view of the battery air dryer.

The support structure 4 shown in FIGS. 2-4 also comprises three ribs 6a, 6b and 7. Ribs 6a and 6b are arranged on the upper surface 15 of the receptacle 27 of the support structure 4 around the snaps 8. The ribs 6a, 6b form small protrusions to the outside of the support structure 4. The rib 7 is formed on the second fixing element 12 and protrudes towards the right in the view of FIGS. 2-4. The ribs 6a, 6b and 7 have a Poka-Yoke function, as will be described below.

The mounting of the battery air dryer 1 in the battery housing 2 and the advantages of the geometry of the battery air dryer 1 will be described in the following in view of FIGS. 5-7.

Figure 5:
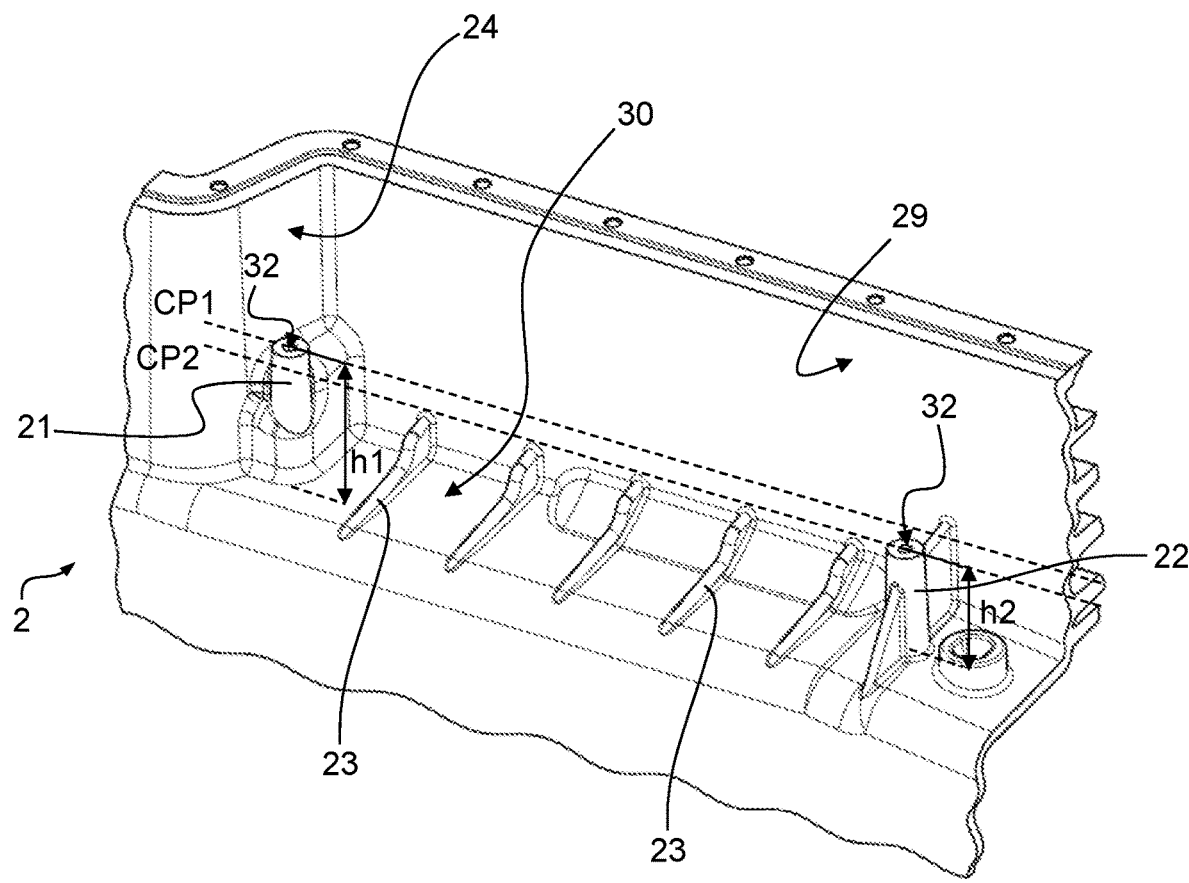
FIG. 5 shows an example of a part of a battery housing.

FIG. 5 shows an example of a part of a battery housing 2. The part of the battery housing 2 shown in FIG. 5 comprises a left side wall 24, a back wall 29 and a bottom wall 30. The battery housing 2 comprises a corresponding first coupling element 21 and a corresponding second coupling element 22. Each of these corresponding coupling elements 21, 22 are formed as cylindrical flanges each having a screw hole 32. The corresponding first coupling element 21 has a height h1 as measured from the bottom wall 30 which is larger than a height h2 of the corresponding second coupling element 22 as measured from the bottom wall 30.

An upper part of the first coupling element 21 extends along a first coupling plane CP1. The first coupling plane CP1 does not include any further coupling elements apart from the first coupling element 21. Similarly, an upper part of the second coupling element 22 extends along a second coupling plane CP2. The second coupling plane CP2 does not include any further coupling elements apart from the second coupling element 22.

On the bottom wall 30, five protruding elements 23 are provided. These protruding elements 23 are ribs protruding upwards from the bottom wall 30. In the example of FIG. 5, the bottom wall 30 is horizontal and the left side wall 24 and the back side wall 29 are perpendicular thereto.

Figure 6:
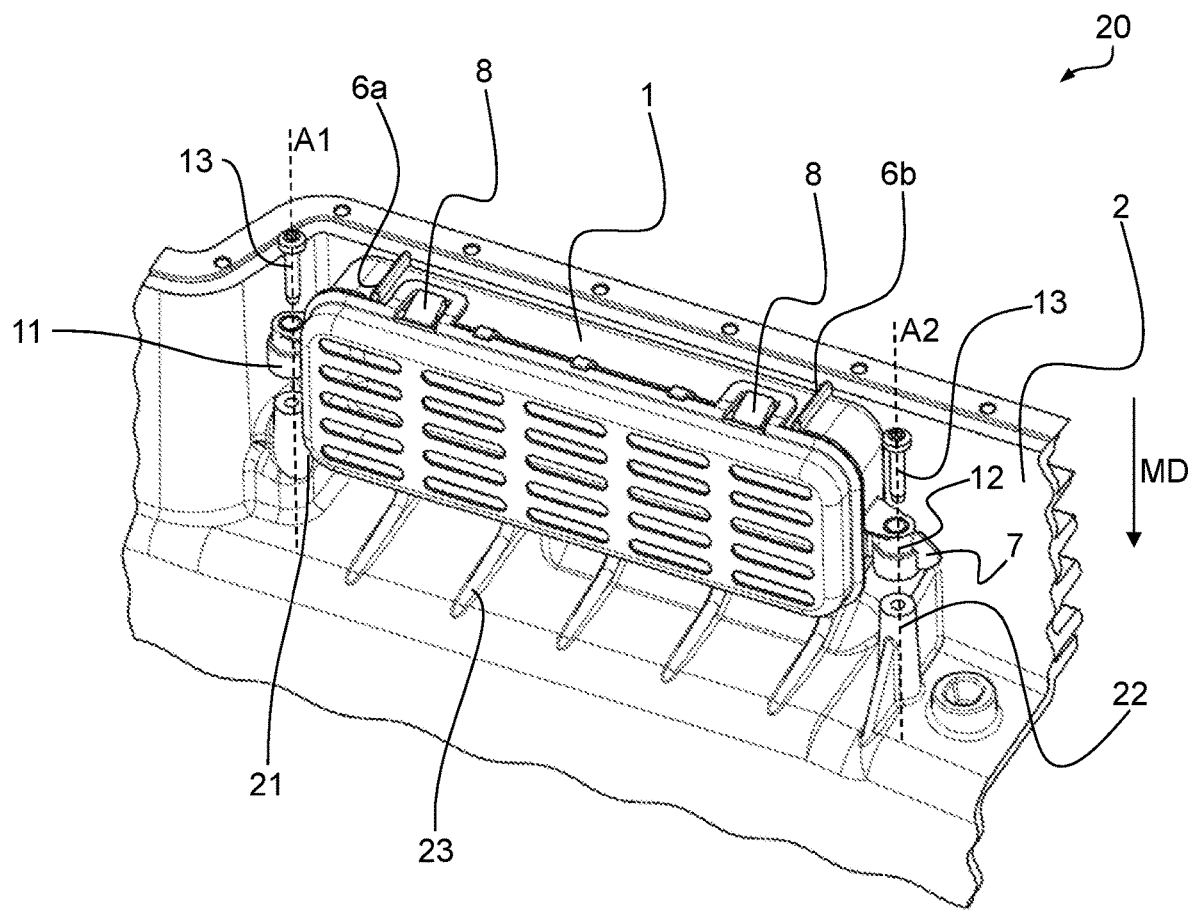
FIG. 6 shows a first view of a battery system.
Figure 7:
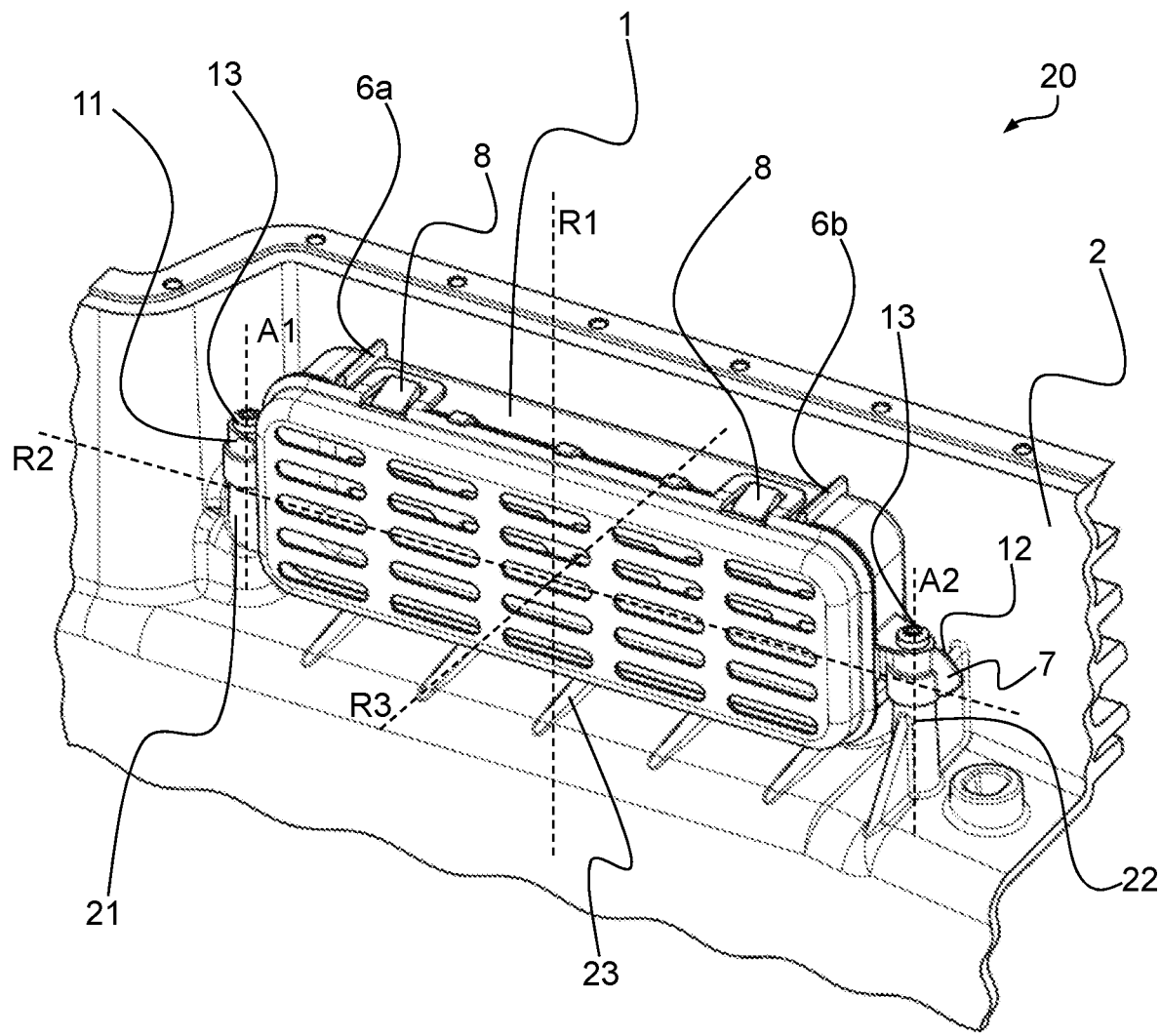
FIG. 7 shows a second view of the battery system.

The battery air dryer 1 can be mounted at the battery housing 2 as indicated in FIGS. 6 and 7, which show views of a battery system 20 comprising the battery housing 2 and the battery air dryer 1. As shown in FIG. 6, the battery air dryer 1 is mounted along a mounting direction MD at the battery housing 2. The orientation of the battery air dryer 1 in FIGS. 6 and 7 corresponds to the designated orientation.

The battery air dryer 1 is mounted at the battery housing 2 such that the first fixing element 11 of the support structure 4 and the corresponding first coupling element 21 of the battery housing 2 contact each other and such that the second fixing element 12 of the support structure 4 and the corresponding second coupling element 22 of the battery housing 2 contact each other. It can also be said that the first fixing element 11 couples with the corresponding first coupling element 21 and that the second fixing element 12 couples with the corresponding second coupling element 22 (FIG. 7).

The first fixing element 11 couples with the corresponding first coupling element 21 such that their screw holes 31, 32 are aligned along a first screw axis A1. The second fixing element 12 couples with the corresponding second coupling element 22 such that their screw holes 31, 32 are aligned along a second screw axis A2.

As shown in FIGS. 6 and 7, the battery air dryer 1 is fixed to the battery housing 2 by screwing screws 13 into the screw holes 31, 32. FIG. 7 shows the battery air dryer 1 when it is correctly fixed to the battery housing 2. In that fixed position, the snaps 8 of the support structure 4 are visible, allowing to easily verify whether the support structure 4 is closed. It can thereby be avoided that the dryer material 5 empties out into the battery housing 2, thereby damaging the battery components of the battery 3.

Due to its geometry, the battery air dryer 1 can only be mounted and fixed to the battery housing 2 when it is oriented in the designated orientation, as shown in FIGS. 6 and 7.

For example, if one intends to mount the battery air dryer 1 in a first reversed orientation in which the battery air dryer 1 is rotated by 180° around a vertical rotation axis R1, the screw holes 31 of the fixing elements 11, 12 will not be aligned with the screw holes 32 of the corresponding coupling elements 21, 22 due to the height differences between the two fixing elements 11, 12 and between the two corresponding coupling elements 21, 22. In that case, it will be very difficult, if not impossible, to fasten the screws 13 because of the misalignment of the screw holes 31, 32. In addition, in the first reversed orientation, the rib 7 would collide with the left side wall 24, thereby preventing the coupling of the second fixing element 12 with the first corresponding coupling element 21 and of the first fixing element 11 with the second corresponding coupling element 22. It can thus be avoided that the battery air dryer 1 is mounted in the first reversed orientation.

Similarly, when one intends to mount the battery air dryer 1 in a second reversed orientation in which the battery air dryer 1 is rotated by 180° around a horizontal rotation axis R2 extending along a left-right direction in the representation of FIG. 7, the ribs 6a and 6b collide with the bottom wall 30, thereby preventing the coupling of the first fixing element 11 with the first corresponding coupling element 21 and of the second fixing element 12 with the second corresponding coupling element 22. Further, in the second reversed orientation, the screw holes 31 of the fixing elements 11, 12 are not aligned with the screw holes 32 of the corresponding coupling elements 21, 22 either. It can thus be avoided that the battery air dryer 1 is mounted in the second reversed orientation.

Further, if one intends to mount the battery air dryer 1 in a third reversed orientation in which the battery air dryer 1 is rotated by 180° around another horizontal rotation axis R3 extending along a front-back direction in the representation of FIG. 7, the rib 7 collides with the left side wall 24 and the ribs 6a and 6b collide with the bottom wall 30, thereby preventing the coupling of the fixing elements 11, 12 with the corresponding coupling elements 21, 22. Further, in the third reversed direction, the screw holes 31 of the fixing elements 11, 12 are not aligned with the screw holes 32 of the corresponding coupling elements 21, 22 either. Thus, the battery air dryer 1 cannot be mounted in the third reversed direction either.

Therefore, the geometry of the battery air dryer 1 prevents an incorrect mounting and fixing of the same to the battery housing. Thereby, it is made sure that the battery air dryer 1 is mounted correctly, namely in the prescribed orientation shown in FIG. 7 and that the snaps 8 are visible for controlling the closure of the support structure 4.

Although the present invention has been described in accordance with preferred embodiments, it is obvious for the person skilled in the art that modifications are possible in all embodiments. For example, the support structure 4 can have a conical shape. The first and/or second fixing elements 11, 12 and/or the corresponding first and/or second coupling elements 21, 22 can be formed differently than the ones described in view of the figures. For example, they may be snaps. The position, size and shape of the ribs 6a, 6b, 7 provided on the support structure 4 can be varied in view of the shape of the battery housing 2. For example, a single rib can be provided on the upper surface 15 of the support structure 4.

REFERENCE NUMBERS 1 battery air dryer
2 battery housing
3 electric vehicle battery
4 support structure
5 dryer material
6a, 6b rib
7 rib
8 attaching element
9 opening
10 hinge
11 first fixing element
12 second fixing element
13 screw
14 bottom surface
15 upper surface
16 left surface
17 right surface
18 front surface
19 back surface
20 battery system
21 corresponding first coupling element
22 corresponding second coupling element
23 protruding element
24 left side wall
25 electric vehicle
26 loop
27 receptacle
28 lid
29 back side wall
30 bottom wall
31 screw hole
32 screw hole
A1 first screw axis
A2 second screw axis
BP base plane
d1 first distance
d2 second distance
h1 first height
h2 second height
CP1 first coupling plane
CP2 second coupling plane
MD mounting direction
FP1 first fixing plane
FP2 second fixing plane
P reference plane
R1 vertical rotation axis
R2 horizontal rotation axis
R3 horizontal rotation axis

What is claimed is:

1. A battery air dryer for drying air within a battery housing of an electric vehicle battery, comprising:
    a support structure as an air dryer housing enclosing a reception chamber in the interior of the housing, the air dryer housing comprising: a receptacle having:
    a back surface forming a back wall of the receptacle, the back surface;
    an upper surface forming an upper side wall of the receptacle, the upper side wall connected to the back wall of the receptacle;
    a bottom surface forming a bottom side wall of the receptacle, the bottom side wall connected to the back wall of the receptacle;
    a left surface forming a left side wall of the receptacle, the left side wall connected to the back wall of the receptacle;
    wherein the upper side wall and the bottom side wall are connected respectively to opposite ends of the left side wall;
    a right surface forming a right side wall of the receptacle, the right side wall connected to the back wall of the receptacle;
    wherein the upper surface and the bottom surface are connected respectively to opposite ends of the right side wall;
    a lid arranged on and extending across the reception chamber on an open front side of the receptacle, the lid removably attached to the receptacle by an attaching element, the lid having:
    a plurality of openings extend through the lid from the reception chamber to an exterior of the air dryer housing;
    wherein the lid, back surface, upper surface, bottom surface, left surface and right surface cooperate to surround the reception chamber in the interior of the air dryer housing;
    a drying material adapted for drying air within the battery housing, the drying material arranged within the reception chamber of the air dryer housing;
    a first fixing element formed the left side wall and projecting outwardly away from the reception chamber to the exterior, the first fixing element configured to couple with a corresponding first coupling element of the battery housing;
    a second fixing element formed the right side wall and projecting outwardly away from the reception chamber to the exterior, the second fixing element configured to couple with a corresponding second coupling element of the battery housing;
    a first distance measured between the first fixing element and a reference plane is different from a second distance measured between the second fixing element and the reference plane,
    wherein the reference plane is a plane cutting the support structure horizontally when the battery air dryer is mounted in the battery housing in a designated orientation;
    wherein only the first fixing element or only the second fixing element is arranged in a first fixing plane that is parallel to the reference plane.

2. The battery air dryer according to claim 1, having a cylindrical hole extending through first fixing element and/or the second fixing element at the exterior of the air dryer housing, the cylindrical hole having a longitudinal axis,
    wherein the longitudinal axis is arranged at the exterior of the air dryer housing.

3. The battery air dryer according to claim 2, wherein the support structure further comprises
    at least one rib arranged on an exterior surface of the receptacle and projecting in a direction outwardly away from the reception chamber.

4. The battery air dryer according to claim 3, wherein
the at least one rib of the support structure is arranged on and projects outwardly from the first fixing element and/or from the second fixing element.

5. The battery air dryer according to claim 4, wherein
the at least one rib of the support structure protrudes in a radial direction relative to the longitudinal axis of the cylindrical hole.

6. The battery air dryer according to claim 1, wherein
the receptacle and the lid is integrally formed.

7. The battery air dryer according to claim 2, wherein
the cylindrical hole is a screw hole configured to be aligned with a screw hole of the corresponding first or second coupling element for fastening a screw through the aligned screw holes.

8. The battery air dryer according to claim 1, wherein
at least one of the first fixing element and the second fixing element comprises
a pin configured to be inserted in an opening of the corresponding first or second coupling element.

9. The battery air dryer according to claim 1, wherein
at least one of the first fixing element and the second fixing element comprises
a clamp configured to clamp to a portion of the corresponding first or second coupling element.

10. The battery air dryer according to claim 1, wherein
at least one of the first fixing element and the second fixing element comprises
a portion configured to be clamped by a clamp provided on the corresponding first or second coupling element.

11. A battery system comprising:
a battery housing configured to accommodate an electric vehicle battery, the battery housing having a first coupling element and a second coupling element; and
a battery air dryer for drying air according to claim 1 within the battery housing, the battery air dryer comprising a support structure and dryer material arranged in the support structure, wherein the support structure comprises:
a first fixing element coupled with the first coupling element of the battery housing and
a second fixing element coupled with the second coupling element of the battery housing,
wherein the reference plane is a plane cutting the support structure horizontally when the battery air dryer is mounted in the battery housing in a designated orientation;
wherein only the first fixing element or only the second fixing element is arranged in a first fixing plane that is parallel to the reference plane.

12. The battery system according to claim 11, wherein
only the first coupling element or only the second coupling element is arranged in a first coupling plane that is parallel to the reference plane.

13. The battery system according to claim 11, wherein a distance between the first coupling element of the battery housing and the reference plane is different from a distance between the second coupling element of the battery housing and the reference plane when the battery air dryer is mounted in the battery housing in the designated orientation.

14. The battery system according to claim 11, wherein the first fixing element couples to the corresponding first coupling element and the second fixing element couples to the corresponding second coupling element only when the battery air dryer is mounted in the designated orientation.

15. The battery system according to claim 11, wherein
the support structure of the battery air dryer further comprises
at least one rib protruding outwardly from the support structure,
wherein the at least one rib is located such that the at least one rib collides with a portion of the battery housing when the battery air dryer is mounted in the battery housing in an orientation different from the designated orientation.

16. The battery system according to claim 15, wherein
the at least one rib of the support structure protrudes from the first fixing element and/or from the second fixing element.

17. The battery system according to claim 11, wherein
wherein the lid is removeably attached to the receptacle by an attaching element,
wherein the attaching element is visible, when the battery air dryer is mounted at the battery housing in the designated orientation, by a person mounting the battery air dryer at the battery housing or controlling whether the battery air dryer is mounted at the battery housing in the designated orientation.

18. An electric vehicle battery comprising
the battery system according to claim 11 and
further comprising battery components for powering an electric vehicle.

19. Then battery air dryer according to claim 1, wherein
the back wall of the receptacle chamber includes a plurality of openings extending through the back surface from the receptacle chamber to an exterior of the air dryer housing.

20. Then battery air dryer according to claim 1, further comprising:
a film hinge formed together with the lid and the receptacle and connecting the lid to the receptacle.

* * * * *